(12) United States Patent
Chung et al.

(10) Patent No.: US 8,700,470 B2
(45) Date of Patent: Apr. 15, 2014

(54) COMPARISON SHOP AD UNITS

(75) Inventors: David Chung, San Francisco, CA (US); Rajas Moonka, San Ramon, CA (US); Gokul Rajaram, Los Altos, CA (US)

(73) Assignee: Google Inc., Mountain View, CA (US)

( * ) Notice: Subject to any disclaimer, the term of this patent is extended or adjusted under 35 U.S.C. 154(b) by 1779 days.

(21) Appl. No.: 11/465,419

(22) Filed: Aug. 17, 2006

(65) Prior Publication Data

US 2008/0046314 A1    Feb. 21, 2008

(51) Int. Cl.
*G06Q 30/00* (2012.01)
*G06Q 10/00* (2012.01)

(52) U.S. Cl.
USPC ............................ 705/14.73; 705/1.1; 705/35

(58) Field of Classification Search
USPC ................ 705/1–20, 35; 707/1–20; 709/1–10
See application file for complete search history.

(56) References Cited

U.S. PATENT DOCUMENTS

| | | | |
|---|---|---|---|
| 6,141,653 | A | 10/2000 | Conklin et al. |
| 6,260,024 | B1 | 7/2001 | Shkedy |
| 6,754,636 | B1 | 6/2004 | Walker et al. |
| 7,076,455 | B1 | 7/2006 | Fogelson |
| 7,127,414 | B1 | 10/2006 | Awadallah et al. |
| 2002/0042750 | A1 | 4/2002 | Morrison |
| 2002/0152001 | A1 | 10/2002 | Knipp et al. |
| 2002/0178074 | A1 | 11/2002 | Bloom |
| 2002/0184088 | A1* | 12/2002 | Rosenberg ...................... 705/14 |
| 2003/0130897 | A1 | 7/2003 | Pickover et al. |
| 2005/0096979 | A1 | 5/2005 | Koningstein |
| 2005/0154717 | A1* | 7/2005 | Watson et al. ..................... 707/3 |
| 2005/0159999 | A1 | 7/2005 | Totten et al. |
| 2006/0059062 | A1* | 3/2006 | Wood et al. ..................... 705/35 |
| 2006/0072733 | A1 | 4/2006 | Ryan et al. |

OTHER PUBLICATIONS

Garrett, J., "Ajax: A New Approach to Web Applications," Adaptive Path, Feb. 18, 2005 [online], [Retrieved on May 19, 2008] Retrieved from the Internet <URL:http://www.adaptivepath.com/ideas/essays/archives/000385print.php>.
PCT International Search Report and Written Opinion, PCT/US07/71398, Jan. 29, 2008, 12 pages.
PCT International Search Report and Written Opinion, PCT/US07/76203, May 16, 2008, 8 pages.
Chitika, Clickfire, 1997-2006 Clickfire.com, [online] [Retrieved on Sep. 1, 2006] Retrieved from the Internet <URL:http://www.clickfire.com/viewpoints/reviews/advertising/chitika/>.
Chitika eMiniMalls—Secrets, FAQ, Tips, and more, [online] [Retrieved on Sep. 1, 2006] Retrieved from the Internet <URL:http://www.experienced-people.co.uk/1098-affiliate-programs/>.

(Continued)

*Primary Examiner* — Sun Li
(74) *Attorney, Agent, or Firm* — Foley and Lardner LLP; John D. Lanza

(57) ABSTRACT

Merchants create ecommerce-enabled ad units advertising items offered by the merchants. The ad units contain functionality enabling customers to purchase the items by interacting with the ad units. The ad units have associated bid prices that the merchants agree to pay for sales through the ad units. The merchants provide the ad units to a broker. The broker publishes the ad units on web pages provided by publishers as comparison shop ad units that contain multiple ad units and functionality for navigating among them. A customer receiving a web page interacts with an ad unit to purchase the item. During the interactions, the broker dynamically updates the ad unit to conduct the transaction.

24 Claims, 9 Drawing Sheets

(56) References Cited

OTHER PUBLICATIONS

Chitika, Inc.—The Leader in Impulse Merchandising, Chitika 2005, 2006, [online] [Retrieved.on Sep. 1, 2006] Retrieved from the Internet <URL:http://www.chitika.com/mm_overview.php>.

eSupport, Chitika, [online] [Retrieved on Sep. 1, 2006] Retrieved from the Internet <URL:http://chitika.com/support/index.php?_m=knowledgebase&_a=viewarticle&kbarticleid>.

"FirePoppy, Broker Pro.," FirePoppy, Inc., 1 page, [Archived on web.archive.org on Aug. 22, 2003; Retrieved on May 19, 2011] Retrieved from the internet <URL:http://replay.web.archive.org/20030822021619/http://www.firepoppy.com/broker_pro.phtml>.

"Shopatron FAQ," FirePoppy, Inc., 3 pages, [Archived on web.archive.org on Jan. 17, 2004; Retrieved on May 19, 2011] Retrieved from the internet <URL:http://replay.web.archive.org/20040117021450/http://www.firepoppy.com/FAQ.phtml>.

Letter from Ed Stevens, Fire Poppy, Inc. to Jim Hudson, Sullivan Products, dated Sep. 12, 2000, 6 pages.

Screenshots Shopatron (#1-#7), Shopatron, Ltd. 1999, 7 pages, [retrieved from the internet on Aug. 10, 2000] Retrieved from the internet <http://shopatron.ooi.net/shopping_cart.phtml>; <http://shopatron.ooi.net/checkout1.phtml>; <http://shopatron.ooi.netlcheckout3.phtml?multi=>; <http://shopatron.ooi.netlcheckout4.phtml>.

\* cited by examiner

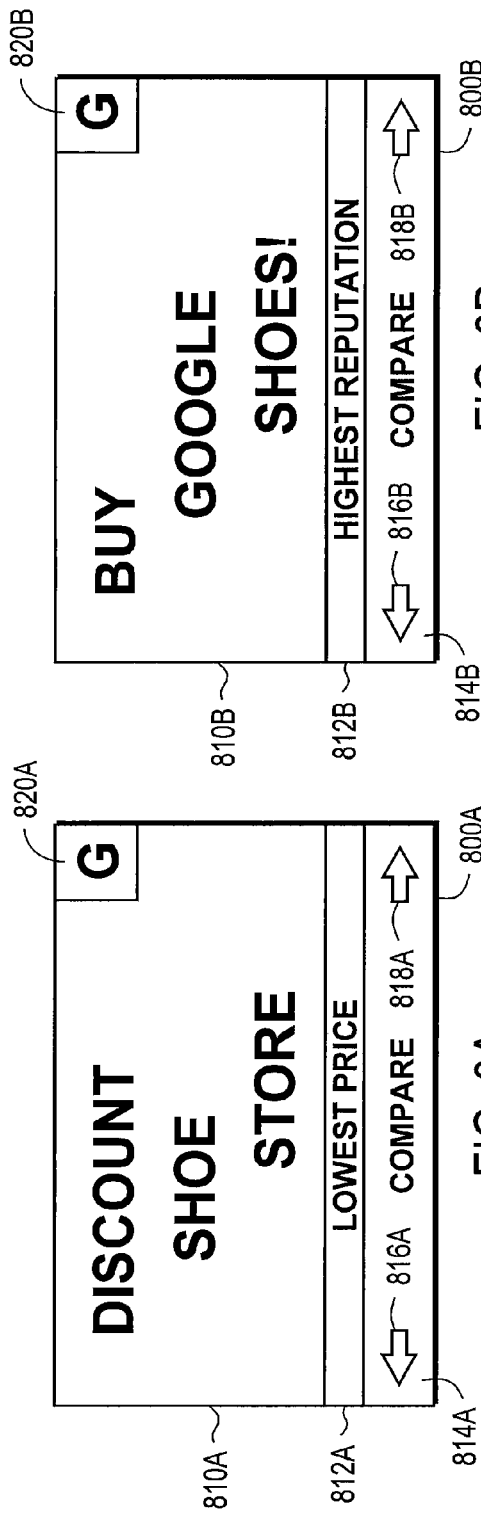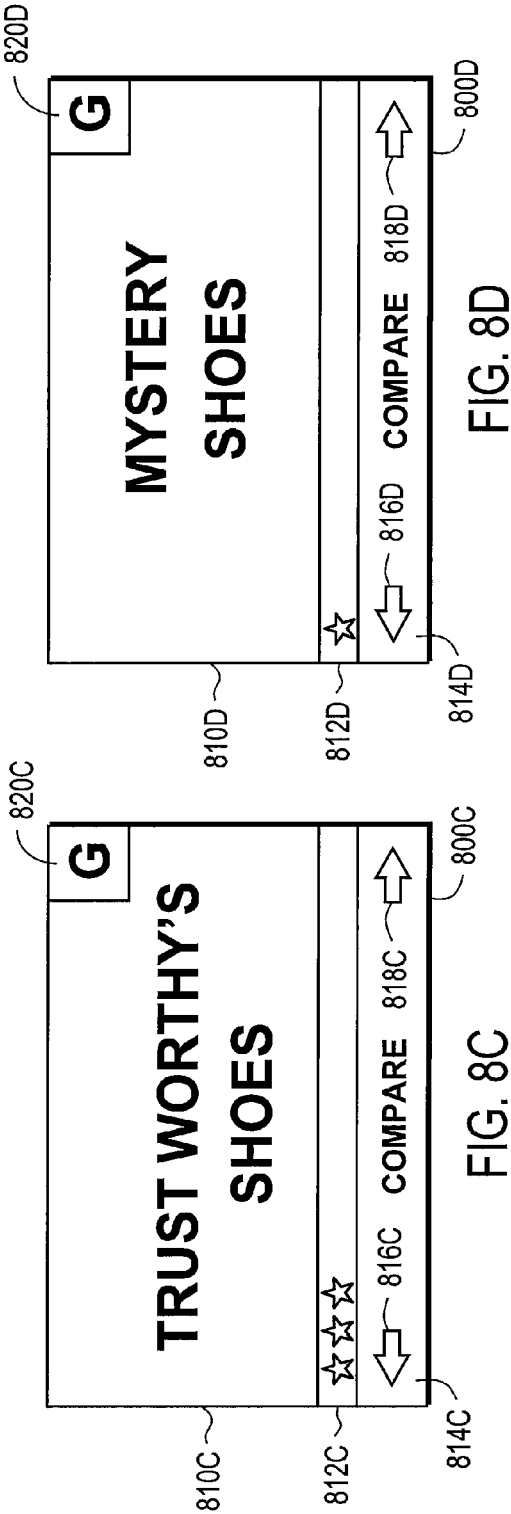

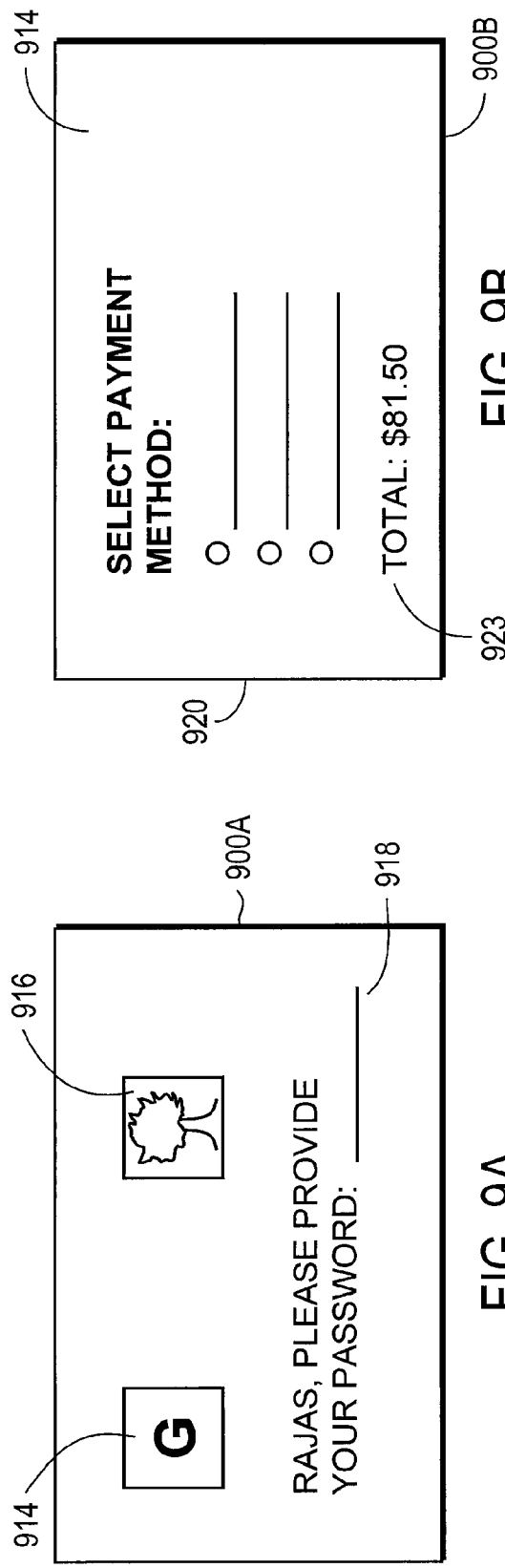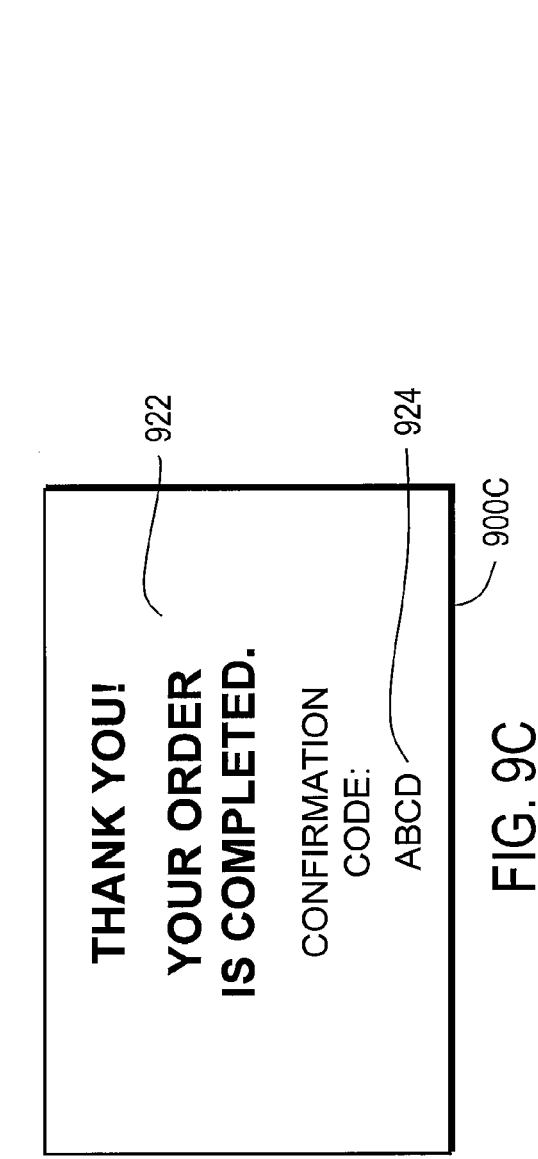

COMPARISON SHOP AD UNITS

CROSS-REFERENCE TO RELATED APPLICATION

This application is related to U.S. patent application Ser. No. 11/424,516, entitled "Ecommerce-Enabled Advertising" and filed on Jun. 15, 2006, which is hereby incorporated herein by reference.

BACKGROUND OF THE INVENTION

1. Field of the Invention

This invention pertains in general to electronic commerce and in particular to advertising and selling items on the Internet.

2. Description of the Related Art

Electronic commerce on the Internet has become commonplace. There are many merchants offering items via web sites on the Internet, and there are an even greater number of customers who purchase the items. In many cases, the electronic commerce transactions involve physical items. For example, many customers purchase items such as books, compact disks (CDs) and DVDs via the Internet. Customers also purchase electronic items such as downloadable text, music, and access to web sites that provide news or entertainment stories.

Many merchants promote themselves and their offered items by running online advertising programs. The merchants create electronic ads, such as banner ads or small textual ads, and run these ads on their own or others' web sites. Google Inc. of Mountain View, Calif., for example, provides an ADWORDS program that lets merchants create ads and choose criteria that match the ads to potential customers. The ADWORDS program then runs the ads on web pages likely to be viewed by the customers. In addition, Google Inc. provides a corresponding ADSENSE program that lets web site publishers run ads from merchants on the publishers' sites.

While the advertising programs described above are successful, there are some drawbacks associated with them. One drawback is that the ads usually link to merchant web pages that are not specific to the ads. For example, an ad that offers tickets to a particular movie or concert might link to a general page about movies, and not to the specific page allowing the customer to purchase tickets for the advertised movie. As a result, the customer must then navigate from the general page to the specific page for the movie. This extra navigating is undesirable because it leads to customer attrition and reduced sales.

Another drawback is that the customers navigate away from the ad-bearing web page when they select the ad. The publishers who carry the ads often seek to keep the customers on the publishers' own web pages. Selecting an ad takes a customer away from the original web page and interrupts the customer's interaction with the publisher.

Moreover, customers who are interested in an advertised product are oftentimes reluctant to purchase items from smaller or relatively unknown merchants. These merchants lack the brand recognition and trust associated with larger, better known merchants. Therefore, the customers hesitate to engage in risky behavior, such as providing credit card numbers, shipping addresses, or other personally-identifiable information to the merchants, resulting in fewer purchases than would occur if this drawback were not present.

Accordingly, there is a need in the art for a way to overcome the drawbacks described above.

BRIEF SUMMARY OF THE INVENTION

The above need is met by a method of conducting electronic commerce on a network that includes accessing a collection of electronic commerce-enabled ad units advertising items offered by merchants, generating a comparison shop ad unit including two or more ad units selected from the collection and having functionality for navigating among the two or more ad units, and publishing the comparison shop ad unit to customers via the network.

In addition, the above need is met by a system and computer program product for conducting electronic commerce on a network. The system and computer program product include a comparison shop ad generation module for generating a comparison shop ad unit including two or more ad units selected from a collection of electronic commerce-enabled ad units advertising items offered by merchants and having functionality for navigating among the two or more ad units, and an ad unit serving module for serving the comparison shop ad unit to customers via web pages published by publishers on the network.

BRIEF DESCRIPTION OF THE DRAWINGS

FIG. 8 illustrates sample displays, labeled FIG. 8A-8D, generated by four individual ad units from different merchants contained within a single comparison shop ad unit according to one embodiment.

FIG. 9 illustrates three sample displays, labeled FIGS. 9A-9C, that the broker creates in a particular ad unit once the ad unit is selected by the customer according to one embodiment.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

A. Overview

Figure 1:
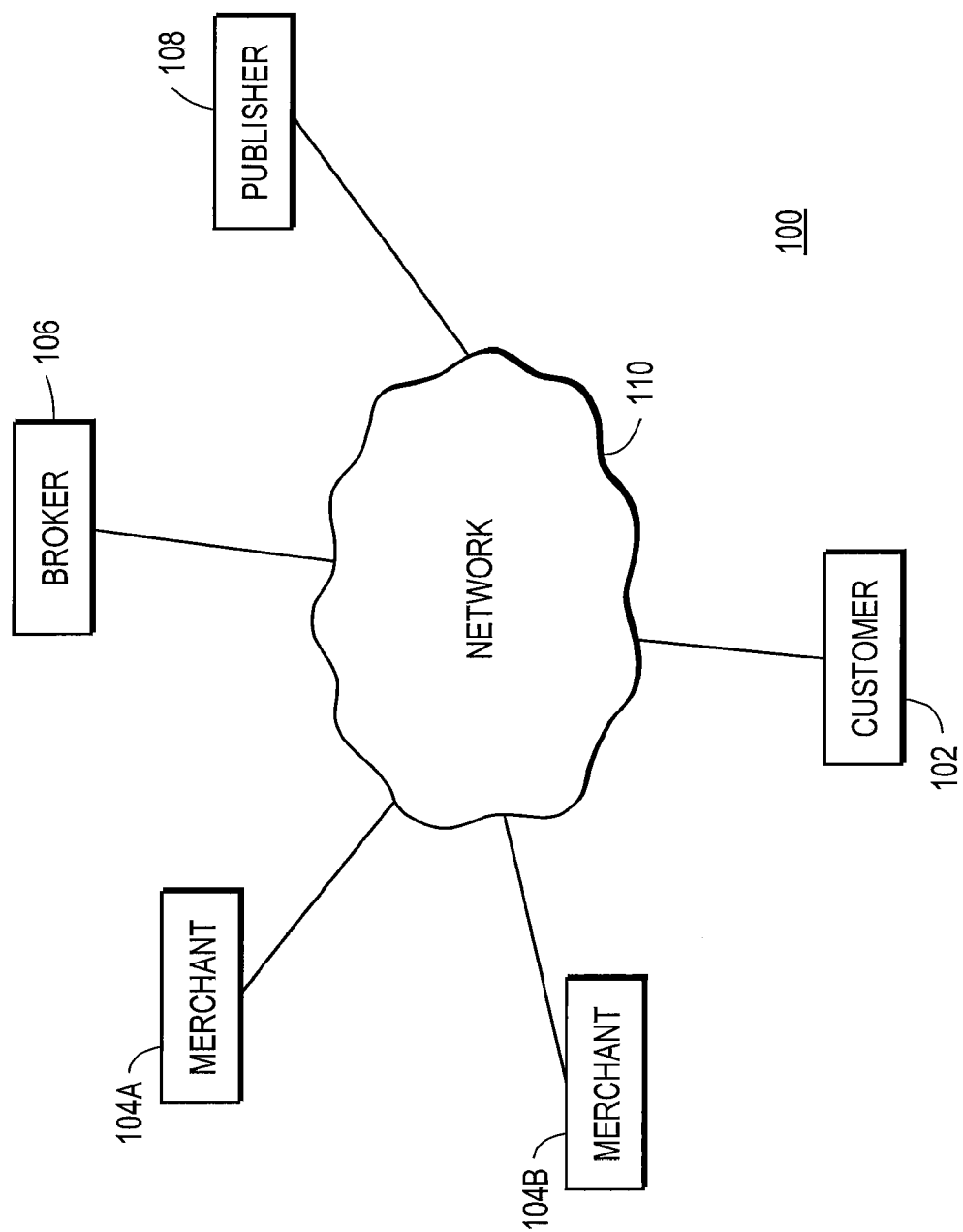
FIG. 1 is a high-level block diagram of a computing environment according to one embodiment.

FIG. 1 is a high-level block diagram of a computing environment 100 according to one embodiment of the present invention. FIG. 1 illustrates a customer 102, two merchants 104A-B, a broker 106, and a publisher 108 connected by a network 110. At a high level, the merchants 104 create one or more advertisements (ads) advertising items offered by the merchants 104. The publisher 108 serves web pages or other electronic documents to the customer 102. The broker 106 causes the merchants' ads to appear on the pages served by the publisher 108. In one embodiment, ads from both merchants appear within a single ad unit called a "comparison shop ad unit." The customer 102 can interact with the comparison shop ad unit to view the merchants' ads, compare the merchants' offers and purchase the item from one of the merchants 104, all without leaving the page served by the publisher 108. In one embodiment, the broker 106 includes a payment system that facilitates the transaction.

FIG. 1 and the other figures use like reference numerals to identify like elements. A letter after a reference numeral, such as "104A," indicates that the text refers specifically to the element having that particular reference numeral. A reference numeral in the text without a following letter, such as "104," refers to any or all of the elements in the figures bearing that reference numeral (e.g. "104" in the text refers to reference numerals "104A" and/or "104B" in the figures).

The network 110 represents the communication pathways between the customer 102, merchants 104, broker 106, and publisher 108. In one embodiment, the network 110 is the Internet. The network 110 can also utilize dedicated or private communications links that are not necessarily part of the Internet. In one embodiment, the network 110 uses standard communications technologies and/or protocols. Thus, the network 110 can include links using technologies such as Ethernet, Wi-fi (802.11), integrated services digital network (ISDN), digital subscriber line (DSL), asynchronous transfer mode (ATM), etc. Similarly, the networking protocols used on the network 110 can include multiprotocol label switching (MPLS), the transmission control protocol/Internet protocol (TCP/IP), the hypertext transport protocol (HTTP), the simple mail transfer protocol (SMTP), the file transfer protocol (FTP), etc. In one embodiment, at least some of the links use mobile networking technologies, including general packet radio service (GPRS), enhanced data GSM environment (EDGE), code division multiple access 2000 (CDMA2000), and/or wide-band CDMA (WCDMA). The data exchanged over the network 110 can be represented using technologies and/or formats including the hypertext markup language (HTML), the extensible markup language (XML), the wireless access protocol (WAP), the short message service (SMS) etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

The publisher 108 is an entity that provides web pages and/or other electronic documents to customers 102. The publisher 108 can be, for example, a major Internet web site operated by a national media outlet, a personal blog on a web server operated by a lone individual, and/or another distributor of web pages. While only one publisher 108 is shown in FIG. 1, embodiments of the environment 100 can have thousands or millions of different publishers. Only one publisher 108 is shown for purposes of clarity. This description uses the term "web page" to refer to any electronic document served by a publisher 108, regardless of whether the document is technically a web page.

At least some of the web pages served by the publisher 108 have regions that can contain ads. For example, an ad can be displayed as a banner across the top of the page, in the upper-left corner of the page, and/or along the right-side margin of the page. Collectively, the available ad placement regions on the web pages of the thousands or millions of publishers 108 on the network 110 represent a vast inventory of ad space.

A merchant 104 represents an entity that sells items on the network 110 or makes items available through other types of electronic commerce (ecommerce) transactions. The merchant 104 offering an item to the buyer is sometimes referred to as the "seller" and the transaction is sometimes referred to as a "sale" or "purchase." As used herein, these terms also refer to other types of transactions, regardless of whether the merchant 104 is technically a "seller" or the transaction is technically a "sale." Although FIG. 1 illustrates only two merchants 104A-B, embodiments of the present invention can have many participating merchants.

The merchant 104 creates ad units advertising the items it offers. In one embodiment, the ad units contain aspects designed to entice customers 102 to buy the items being advertised. In addition, the ad units are ecommerce-enabled, meaning that the ad units contain functionality enabling the customers 102 to buy the items by interacting directly with the ads. Thus, the ad units allow the customers 102 to purchase the advertised items without visiting the merchant's web site or otherwise leaving the web page on which the ad is presented.

In one embodiment, the merchant 104 provides the ad units to the broker 106 and/or provides the broker 106 with information the broker uses to create ad units for the merchant. Further, the merchant 104 specifies a bid for each ad unit. The bid represents a price that the merchant 104 agrees to pay the broker 106 when a customer 102 purchases an item through the ad unit. The bid, therefore, resembles a commission to the broker 106. In one embodiment, the merchant 104 also associates targeting criteria with the ad units, such as sets of keywords with which the items being advertised are associated, and/or the types of web sites on which the ad units should appear.

The broker 106 receives the ad units from the merchants 104 and selectively runs the ads on the web pages served by the publishers 108. In one embodiment, the broker 106 identifies web pages that satisfy an ads' targeting criteria, and runs the ad on those pages. In addition, the broker 106 considers the bids made by competing merchants 104 when selecting the ad or ads to show on a particular page. The broker 106 may sell the ad space to the highest bidder, and/or utilize other techniques to select the ad unit that generates the highest revenue to the broker 106.

In one embodiment, the broker 106 forms a comparison shop ad unit containing ad units from multiple merchants 104. Each merchant ad unit within the comparison shop ad unit sells the same item (e.g., the same brand of tennis balls), or related items (e.g., different brands of tennis balls). In another embodiment, the broker 106 forms a comparison shop ad unit containing ad units from a single merchant 104. Each ad unit in the single-merchant comparison shop ad unit sells a different item, although the items can be related. In addition, the broker 106 forms other variations of comparison shop ad units in other embodiments, such as ad units selling different items from multiple merchants. The broker 106 selects the merchant ad units for inclusion in the comparison shop ad unit based on various criteria, including the reputation scores of the merchants, product comparison metrics (e.g., product reviews from consumers or other sources), item availability, and/or revenue produced by the ad units. For example, the broker 106 may select one ad unit from a merchant selling an item at the lowest price, and select a second ad unit from a different merchant that sells a related item that is highly-regarded by consumers.

A comparison shop ad unit occupies the ad space of a single ad unit, but contains functionality allowing the customer 102 to navigate the different ad units contained within it. For example, in one embodiment the comparison shop ad unit contains arrows, tabs, or other tools that the customer 102 selects to traverse through the different merchant ad units contained within it. Thus, the customer 102 is free to compare the offers made by the individual ad units and select the most desirable one.

In one embodiment, the publisher 108 specifies the type of item sold within a comparison shop ad unit. For example, if the publisher 108 provides content about the game of tennis, the publisher can specify that the comparison shop ad unit sell tennis balls. In response, the broker 106 creates a comparison shop ad unit with ads from merchants 104 selling tennis balls, and causes the ad unit to run on the publisher's web page. Further, the publisher 108 can specify a preferred merchant 104 to feature with the publisher's content. In response, the broker 106 creates a comparison shop ad unit with ad units offering products from the preferred merchant 104. The broker 106 selects the ad units to include in the comparison shop ad based on the characteristics of the content published by the publisher 108.

In one embodiment, the broker 106 acts as an intermediary for a transaction between the customer 102 and the merchant 104. The broker 106 operates a payment system that functions as a centralized place that the customers 102 can use to pay for items offered by the merchants 104 via the ad units. Thus, the customers 102 can patronize multiple merchants 104 while providing their payment information to only the broker 106.

Although FIG. 1 illustrates only a single broker 106, embodiments of the present invention have multiple brokers participating in the electronic commerce system. Moreover, in some embodiments the ad serving and payment system functionalities are performed by different entities. Thus, one entity focuses on serving ad units while another entity operates the payment system utilized by the ad units to perform the ecommerce transactions.

The customer 102 is an entity that receives web pages from the publishers 108 and optionally purchases items by interacting with the ad units on those pages. The customer 102 is sometimes referred to as the "buyer" and the transaction is sometimes referred to as a "sale" or "purchase." As used herein, these terms also refer to other types of transactions, regardless of whether the customer 102 is technically a "buyer" or the transaction is technically a "purchase." In addition, this description sometimes uses the term "customer" to refer to a potential customer that has not yet expressed an interest in purchasing an item.

In one embodiment, the customer 102 includes a computer system utilized by an end-user to communicate with other computers on the network 110 in order to effect a purchase. In other embodiments, the customer 102 includes a network-capable device other than a computer system, such as a personal digital assistant (PDA), a cellular telephone, a pager, a television "set-top box" etc. Although FIG. 1 illustrates only one customer 102, embodiments of the present invention can have thousands or millions of customers connected to the network 110.

The customer 102 interacts with an ad unit on a web page received from the publisher 108 to purchase an item from the merchant 104 via the broker's payment system. In response, the broker 106 communicates with the merchant 104 to facilitate the delivery of the purchased item to the customer 102.

The broker 106 collects the bid from the merchant 104, and, in one embodiment, shares the bid with the publisher 108.

Thus, the system described herein allows the merchant 104 to represent its inventory as a collection of ad units, and then publish the ad units on the network 110 in places likely to reach customers 102. For example, a ecommerce bookseller can create ad units for the different book titles it sells, define targeting criteria for each ad unit describing the likely purchasers of the book, and then utilize the broker 106 and publishers 108 to distribute the ad units to the customers 102. Since the customers 102 can purchase the books by interfacing directly with the ad units, the merchant 104 need not maintain a separate web site for selling the books (although the merchant can do so if it desires). Rather, each ad unit functions as its own "virtual storefront."

II. System Architecture

Figure 2:
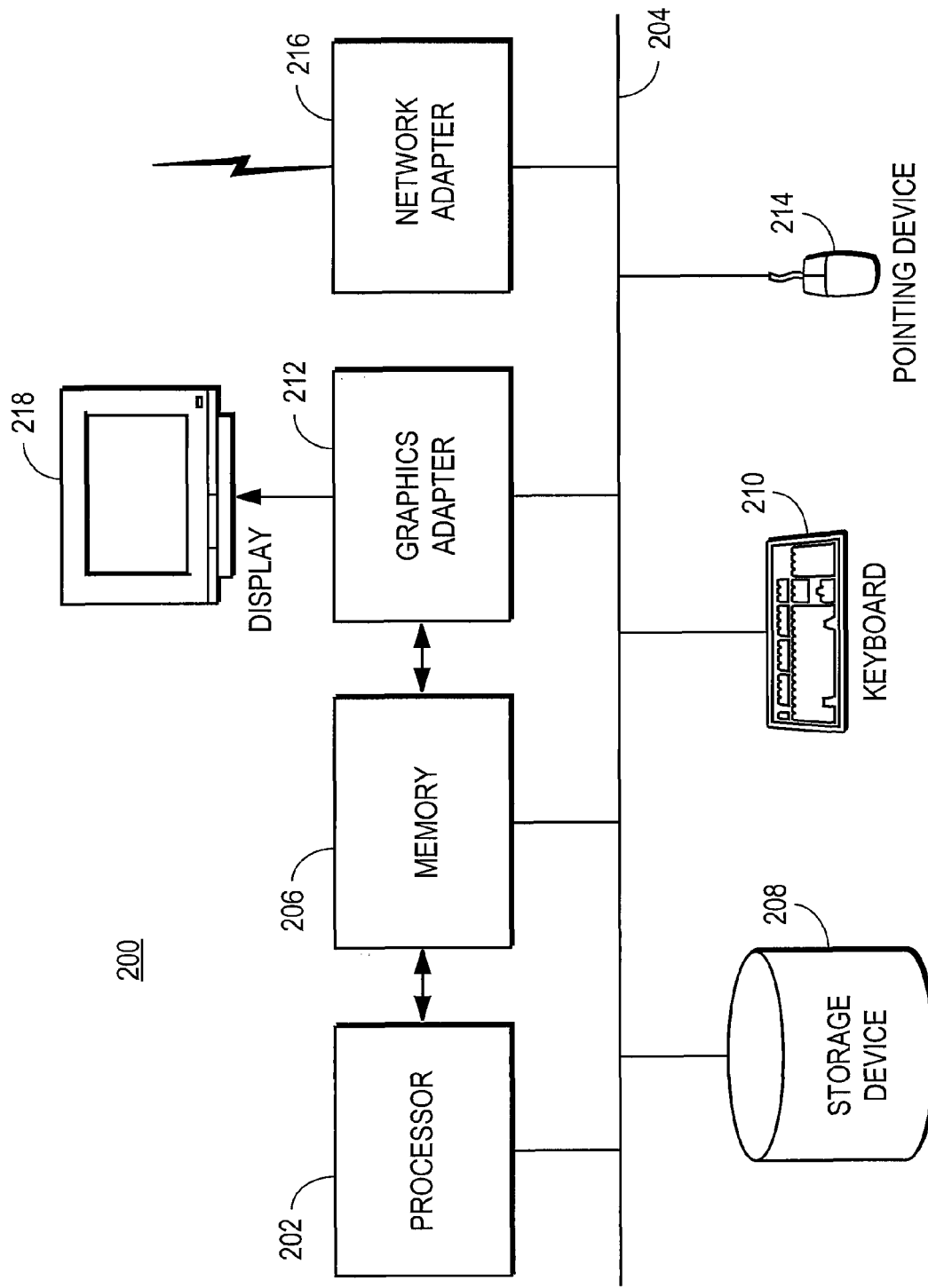
FIG. 2 is a high-level block diagram illustrating a functional view of a typical computer system for use as one of the entities illustrated in the environment of FIG. 1 according to one embodiment.

FIG. 2 is a high-level block diagram illustrating a functional view of a typical computer system 200 for use as one of the entities illustrated in the environment 100 of FIG. 1 according to one embodiment. Illustrated are at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 110.

As is known in the art, the computer system 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computer systems 200 utilized by the entities of FIG. 1 can vary depending upon the embodiment and the processing power utilized by the entity. For example, the customer 102 typically requires less processing power than the merchant 104, broker 106, or publisher 108. Thus, the customer computer system can be a standard personal computer system. The merchant, broker, and/or publisher computer systems, in contrast, might comprise more powerful computers and/or multiple computers working together to provide the functionality described herein.

Figure 3:
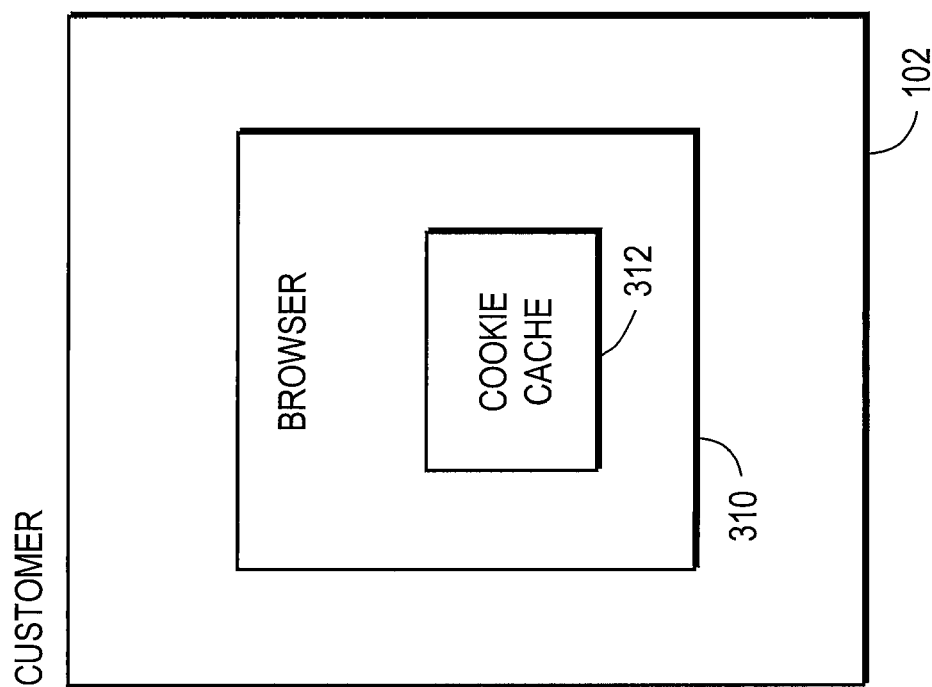
FIG. 3 is a high-level block diagram illustrating modules within a customer according to one embodiment.

FIG. 3 is a high-level block diagram illustrating modules within a customer 102 according to one embodiment. Those of skill in the art will recognize that other embodiments can have different and/or other modules than the ones described here, and that the functionalities can be distributed among the modules in a different manner.

As shown in FIG. 3, the customer 102 includes a browser module 310 that allows the customer to view web pages and other data provided by the merchant 104, broker 106, publisher 108, and/or other entities on the network 110. In one embodiment, the browser module 310 is a conventional web browser, such as MICROSOFT INTERNET EXPLORER or MOZILLA FIREFOX. In one embodiment, the browser module 310 maintains a cookie cache 312 that stores cookies associated with web sites on the network 110. Web sites operated by the merchant 104, broker 106, and publisher 108 can communicate with the browser module 310 and instruct it to create cookies in the cookie cache 312 holding certain information. The browser module 310 provides the cookie to the site that created it or another site with authorization to access the cookie during subsequent interactions, thereby allowing the site to recognize the customer 102.

Figure 4:
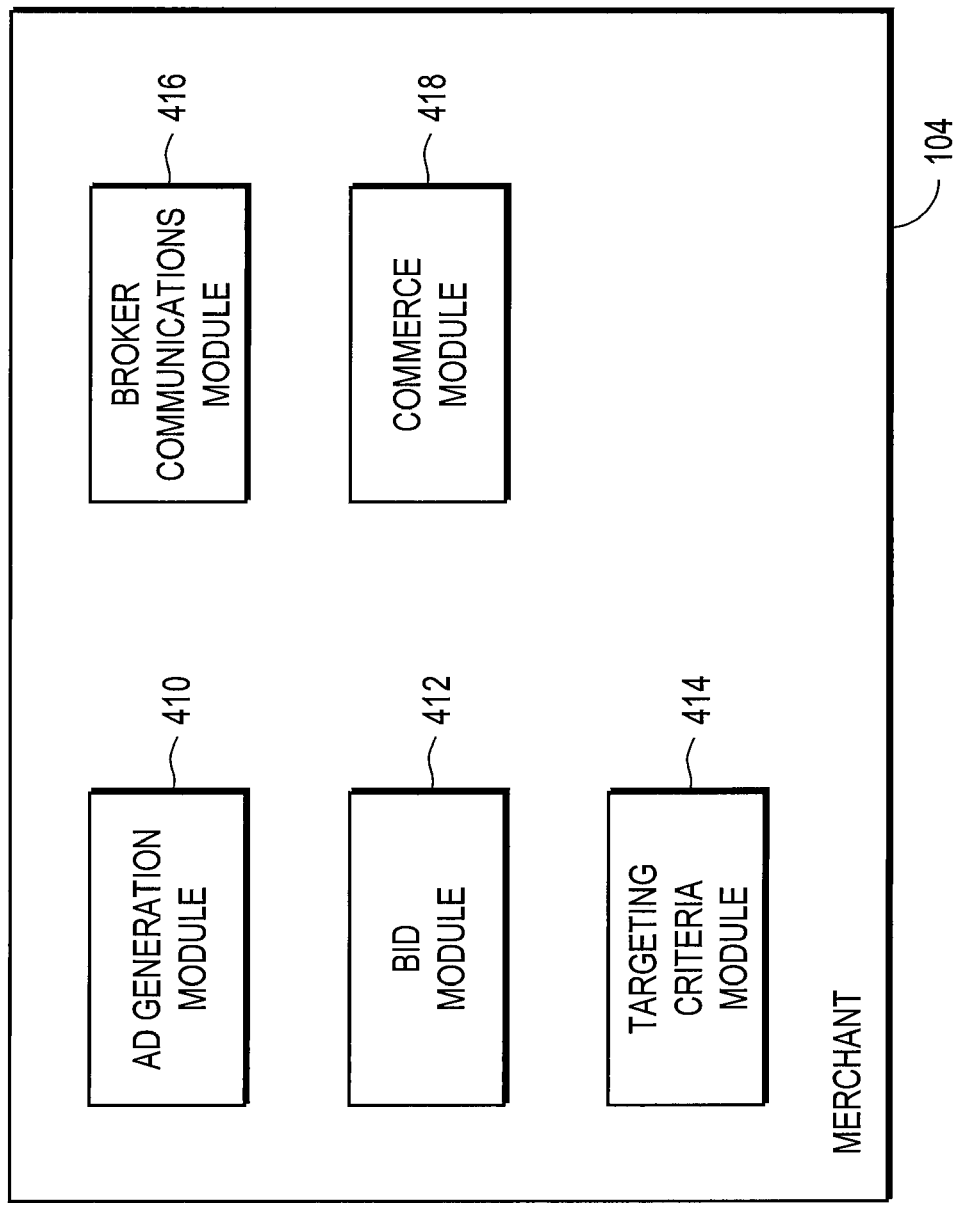
FIG. 4 is a high-level block diagram illustrating modules within a merchant according to one embodiment.

FIG. 4 is a high-level block diagram illustrating modules within a merchant 104 according to one embodiment. Those of skill in the art will recognize that other embodiments can have different and/or other modules than the ones described here, and that the functionalities can be distributed among the modules in a different manner.

An ad generation module 410 generates ecommerce-enabled ad units for the merchant 104. In most cases, each ad unit is designed to sell a single type of item from the merchant's inventory. For example, if the merchant is a bookseller, each ad unit sells a particular title of book stocked by the bookseller. The merchant 104 can also design ad units that sell multiple and/or bundled items.

The ad units are "ecommerce enabled" because a customer 102 can interact directly with the ad units to purchase the advertised items from the merchant 104. Through these interactions, the customer 102 specifies a quantity to purchase, provides payment and shipping information, receives a final price and purchase confirmation, and/or performs other steps utilized in the transaction. In one embodiment, the ad units interact with the payment system provided by the broker 106 to effect the ecommerce transactions.

An ad unit contains dynamic content that is updated as the customer 102 interacts with it. In one embodiment, the ad unit includes and/or references multiple web pages or other elements that collectively allow the customer 102 to specify a quantity, provide payment information, etc. The web pages are updated in real-time using Asynchronous JavaScript and XML (AJAX) technology and/or other technologies that allow individual components of web pages to be updated dynamically and asynchronously.

In one embodiment, the ad generation module 410 operates on an ad template received from the broker 106 and/or another source. The ad template defines the basic format of the ad unit, such as its size and the locations of elements such as text and video, and includes stubs for the ecommerce functionality. The merchant 104 utilizes the ad generation module 410 to customize the template by adding artwork, defining behaviors, and making other alterations to customize the ad unit.

In one embodiment, the merchant 104 utilizes the ad generation module 410 to associate advertising data with the ad unit. The advertising data are designed to attract a customer 102 and cause the customer to interact with the ad unit to purchase the item being advertised. The advertising data include text, images, video, audio, and/or other forms of media that are displayed when the ad unit is published.

In addition, the merchant 104 utilizes the ad generation module 410 to associate transaction data with the ad unit. The transaction data are used to conduct the ecommerce transaction using the ad unit and include information such as the name, description, availability, and price of the item being advertised, tax rules describing how to tax sales of the item in one or more jurisdictions, shipping rules describing costs and limitations on delivering the item to the customer 102, a merchant stock keeping unit (SKU) that uniquely identifies the item to the merchant, etc.

In one embodiment, the ad generation module 410 embeds the advertising and transaction data directly within the ad unit. In another embodiment, some data, such as the SKU, are embedded within the ad unit while other data are maintained separately and provided to the broker 106 via a separate feed. This latter embodiment allows the merchant 104 to dynamically update certain data, such as the price and availability, without creating a new ad unit.

In one embodiment, the ad generation module 410 defines data for an ad unit and provides the data to the broker 106. For example, the merchant 104 uses the ad generation module 410 to provide the broker 106 with a feed or list of products for sale (along with related data, such as descriptions, prices, etc.). The broker 106, in turn, creates the ad unit using the defined data.

A bid module 412 defines a bid price that the merchant 104 agrees to pay the broker 106 when the item advertised by the ad unit is sold to a customer 102. The bid price can be specified as a percentage of the sale price (e.g., 5%) or as a flat fee (e.g., $10). The bid is essentially a commission that the merchant 104 agrees to pay the broker 106 for a sale, and also represents the merchant's cost per acquisition (CPA) (also called a "cost per action") of a customer 102. A bid based on a percentage of the sale price is referred to as a "cost per sale" (CPS) in some contexts. In one embodiment, the bid module 412 stores the merchant's bid as transaction data associated with the ad unit.

A targeting criteria module 414 defines targeting criteria for the ad unit. In one embodiment, the merchant 104 uses the targeting criteria module 414 to describe in what circumstances and/or where the ad should appear. In one embodiment, ad units are contextually targeted and/or site-targeted.

The targeting criteria for a contextually targeted ad unit describe the context in which the ad unit should appear. In one embodiment, the contextual targeting criteria include keywords identifying terms with which the ad unit is associated. For example, if the ad unit is selling tennis balls, the targeting criteria can include keywords such as "tennis," "racquet," "Wimbledon," etc.

The targeting criteria for a site-targeted ad unit describe web sites (i.e., content provided by publishers 108) where the merchant 104 desires the ad unit to appear. The targeting criteria identify the sites explicitly and/or indirectly through demographic or other criteria. For example, the targeting criteria can specify that the ad unit should appear on web pages from the site "www.google.com" and/or that the ad unit should appear on sites with many visitors within the 18-34 age demographic. The targeting criteria can also specify whether the ad unit can appear in a comparison shop ad unit.

In one embodiment, the merchant 104 utilizes the bid module 412 in combination with the targeting criteria module 414 to define bid prices that the merchant pays when a potential customer 102 clicks (i.e., selects) an ad unit, regardless of whether the customer 102 eventually purchases the item being advertised. Further, in one embodiment the merchant 104 utilizes these two modules 412, 414 to define bid prices that the merchant pays when an ad unit is displayed on a web page (i.e., for each impression of the ad). The merchant 104 can make these bids in addition to, or instead of, the bid for each sale of an advertised item.

A broker communications module 416 communicates with the broker 106 via the network 110. In one embodiment, the broker communications module 416 provides the merchant's ad units to the broker 106. As described above, in some embodiments all of the data defined for the ad units are embedded in the ad units sent to the broker 106. In other embodiments, the broker communications module 416 sends data that the broker 106 uses to create ad units. In still other embodiments, the broker communications module 416 sends the broker 106 ad units and a separate data feed with additional data for the ad units. For example, the broker communications module 416 sends the broker 106 an ad unit containing a SKU or other identification that uniquely identifies the ad unit. The broker communications module 416 also sends the broker 106 a separate data feed that contains data for ad units identified by their SKUs.

In one embodiment, merchant-broker communications are conducted using the web services description language (WSDL). The broker communications module 416 uses the WSDL to describe the services it provides and ascertain the services provided by the broker 106. The broker communications module 416 uses XML-based remote procedure calls (RPCs) to provide information to the broker 106 and receive information in return. In other embodiments, the broker communications module 416 communicates with the broker 106 using other techniques and/or protocols, such as via email messages, HTML web pages intended for review by human users, proprietary communications protocols, etc.

A commerce module 418 supports ecommerce transactions involving the merchant 104. In one embodiment, the commerce module 418 interacts with the broker 106 via the broker communications module 416 to facilitate purchases by customers 102 made through the ad units. To this end, the commerce module 418 supports transactions performed by the broker 106 by, for example, specifying tax rates for different jurisdictions, calculating shipping costs to the customer, notifying the broker 106 when an order ships, and providing tracking numbers for shipped items. In one embodiment, the commerce module 418 performs backend tasks for the merchant 104, such as maintaining inventories, coordinating shipping, emailing receipts to customers 102, and/or performing accounting.

Figure 5:
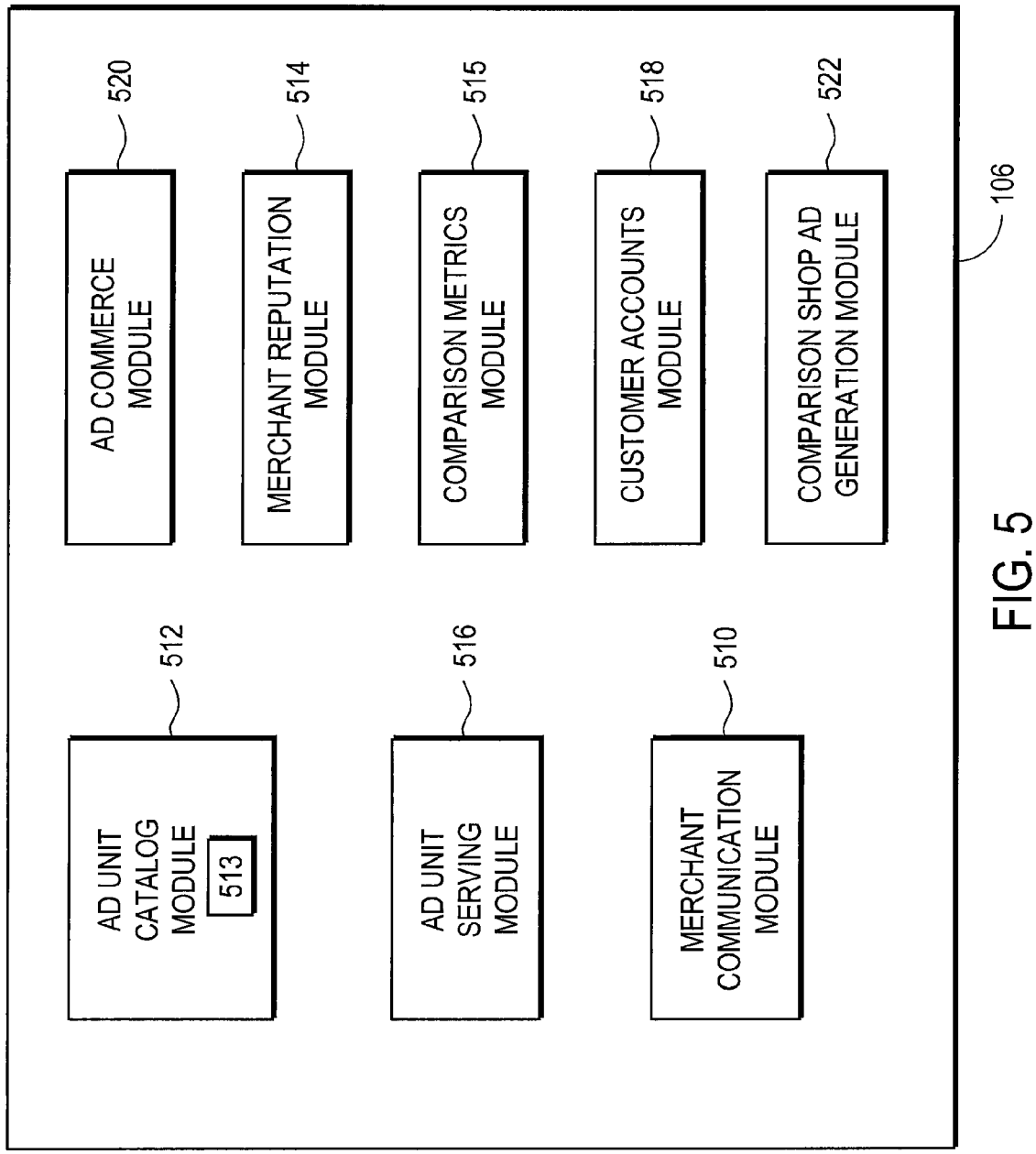
FIG. 5 is a high-level block diagram illustrating modules within a broker according to one embodiment.

FIG. 5 is a high-level block diagram illustrating modules within the broker 106 according to one embodiment. Those of skill in the art will recognize that other embodiments can have different and/or other modules than the ones described here, and that the functionalities can be distributed among the modules in a different manner.

The broker 106 includes a merchant communications module 510 for communicating with the merchants 104. The merchant communications module 510 performs functions including receiving ad units, ad data and/or data feeds from the merchants, and communicating with the merchants to facilitate ecommerce transactions. In one embodiment, this module 510 is the counterpart to the broker communications module 416 in the merchant 104.

An ad unit catalog module 512 stores ad units 513 received from the merchants 104. The ad unit catalog 512 serves as a data repository from which the ad units can be retrieved and served on web pages published by the publishers 108, either individually or as parts of comparison shop ad units. In one embodiment, the ad unit catalog 512 receives the data contained in any data feeds from the merchants 104 and associates the data with the corresponding ad units. For example, the ad unit catalog 512 associates data referencing a particular merchant's SKU with the ad unit corresponding to that SKU.

In one embodiment, the ad unit catalog module 512 includes functionality for creating ad units 513 based on ad unit data received from a merchant 104 and/or another source. This functionality allows the broker 106 to receive a data feed from the merchant 104 and utilize the data to create ad units in the catalog module 512. Similarly, in one embodiment, the ad unit catalog module 512 and/or another module in the broker 106 creates ad units dynamically based on data stored in the ad unit catalog module 512 or elsewhere. For example, the ad unit catalog module 512 stores data describing items offered by the merchants 104 and dynamically creates an ad unit when necessary.

In one embodiment, the ad unit catalog 512 provides a public interface that allows publishers 108 and/or other entities to browse the ad units in the catalog. The interface supports browsing by merchant, item, item type, item price, bid price, and/or other criteria. This interface is used, for example, by publishers 108 that desire to select or otherwise specify the ad units that will appear on their web pages.

In one embodiment, the ad unit catalog module 512 is located in a data repository external to the broker 106. For example, the ad unit catalog module 512 is maintained by a dedicated entity and/or associated with another entity on the network 110. FIG. 5 shows the ad unit catalog 512 within the broker 106 for purposes of clarity.

A merchant reputation module 514 monitors transactions performed by the broker 106 on behalf of the merchants 104 and calculates reputation scores indicating the relative qualities of the merchants 104. Since the broker 106 conducts payment-related processing on behalf of merchants 104 in one embodiment, the merchant reputation module 514 receives transaction data indicating the relative qualities of the merchants. For example, an embodiment of the merchant reputation module 514 favors merchants that have relatively high amounts and/or volumes of transactions. These data signal that the merchants 104 are popular. Similarly, an embodiment of the merchant reputation module 514 measures the delay between when orders are placed and when they are fulfilled by merchants 104 in order to evaluate the merchants' inventory and processing efficiencies. Merchants 104 that fulfill orders promptly are favored over other merchants. Further, an embodiment of the merchant reputation module 514 measures the number and/or amount of refund and chargeback requests made for the merchants 104. Merchants 104 with fewer refund and chargeback requests are favored over merchants with more such requests. In one embodiment, the merchant reputation module 514 provides an interface allowing customers 102 to provide feedback describing their experiences with the merchants 104. Embodiments of the merchant reputation module 514 use other and/or additional data to calculate reputation scores for the merchants 104.

In one embodiment, the merchant reputation module 514 quantizes a merchant's reputation score into a numerical and/or graphical rating, such as assigning the merchants one through five stars, where five stars indicates the highest possible reputation. This rating is added to the ad units stored in the ad unit catalog 512 and/or otherwise included in ad units published by the publishers 108. In one embodiment, the broker 106 causes a merchant's rating to appear on the merchant's ad units, thereby providing the customer 102 with an indication of the merchant's reputation.

A comparison metrics module 515 stores and/or accesses data for comparing the relative merits of the items offered by the merchants 104. These metrics data can include customer reviews and ratings of items, sales and returns volume for items, shipping times by merchants for the items, etc. In one embodiment, the metrics data are quantized to comparison metrics scores in a similar manner as the merchant reputation scores to permit the items to be ranked and sorted based on the items' relative merits. In one embodiment, the comparison metrics module 515 also stores and/or accesses data for identifying related items from one or more merchants. These related items data can include specific item classifications (e.g., data of the type "item x is a type of tennis ball") and relationships derived from customer behavior (e.g., data of the type "customers who bought item x also bought item y"). In one embodiment, the broker 106 causes an item's comparison metric score to appear on an ad unit for the item, thereby providing the customer 102 with an indication of the item's relative merits.

An ad unit serving module 516 selects ad units in the ad unit catalog 512 and serves the ads on web pages published by the publishers 108. In one embodiment, the ad unit serving module 516 selects ad units in real-time, based on the merchant-specified targeting criteria, the merchant's bid price, the merchant's reputation score, the characteristics of the publisher 108 or web page being published, the item availability, and/or other criteria. For example, if the web page served by the publisher contains the terms "tennis" and "racquet," and an ad unit has those terms in its targeting criteria, the ad serving module 516 serves the ad unit on the web page. In one embodiment, the ad unit serving module 516 provides the ad unit catalog module 512 with criteria for an ad unit (e.g., an ad unit matching "tennis"), and the ad unit catalog module dynamically creates the ad unit and provides it to the serving module.

If there are multiple ad units having targeting criteria satisfied by a particular web page, an embodiment of the ad unit serving module 516 analyzes the bid prices and/or the historical performances of the ad units to identify and select the ad unit or units likely to maximize revenue to the broker 106 and/or publisher. For example, an embodiment of the ad unit serving module 516 is more likely to select an ad unit with a lower bid that has historically produced high sales over an ad unit with a slightly higher bid that has historically produced few sales. Likewise, an embodiment of the ad unit serving module 516 is more likely to select an ad unit from a merchant 104 having a high reputation score than a unit from a merchant having a lower score. Thus, the ad unit serving module 516 might select an ad unit from a merchant 104 with a high transaction volume and relatively few refund requests over an ad unit from a merchant without these qualities. Similarly, an embodiment of the ad unit serving module 516 is more likely to select an ad unit selling an item having a higher comparison metrics score than an ad unit selling an item with a lower comparison metrics score.

In one embodiment, the ad unit serving module 516 operates in tandem with a comparison shop ad generation module 522 (referred to herein as the "comparison shop module"). This latter module 522 generates comparison shop ad units either dynamically or ahead of time, and the comparison shop ad units are served by the ad unit serving module 516. The comparison shop module 522 utilizes defined criteria to select two or more ad units from the ad unit catalog module 512 and combine the ads into a comparison shop ad unit.

The criteria utilized by the comparison shop module 522 to select the ads to include in a comparison shop ad unit can vary depending upon the embodiment. In one embodiment, the comparison shop module 522 identifies one or more items or types of item to offer based on item selection criteria such as the merchant-specified targeting criteria, publisher-specified criteria, the characteristics of the publisher 108 or web page being published, item availability, and the comparison metrics data from the comparison metrics module 515. In addition, the comparison shop module 522 selects a set of ad units that sell the identified items or types of items based on ad unit selection criteria such as the offered price, item comparison metrics score, and merchant reputation score. Further, the item selection and ad unit selection processes can be influenced by additional broker criteria such as bid prices and historical ad unit performance, as well as by publisher-specified criteria.

In another embodiment, the comparison shop module 522 first identifies one or more merchants based on publisher-specified and/or other criteria, and then identifies ad units from that merchant to include in the comparison shop ad unit. The comparison shop module 522 identifies the ad units to include based on the item selection criteria. For example, the comparison shop module 522 may determine that the publisher 108 requests that ads from a particular sporting goods store be featured on the publisher's web site, and then determine from the content of the publisher's web site that it should select ad units offering tennis balls. Then, the comparison shop module 522 utilizes the comparison metrics data from the comparison metrics module 515 to select ad units for particular brands of tennis balls, and/or select ad units for other related items.

In one embodiment, the comparison shop module 522 combines the selected ad units into a single comparison shop ad unit. As mentioned previously, a comparison shop ad unit occupies a single ad unit inventory space (i.e., appears as a single ad on a published web page) and includes functionality allowing a customer 102 to view and compare the individual ad units contained within it. The customer 102 can select the ad unit that best suits the customer's needs and then interact with the ad unit to purchase the offered item.

Further, an embodiment of the comparison shop module 522 includes information from the merchant reputation 514 and/or comparison metric 515 modules in the comparison shop ad unit. For example, the comparison shop unit can include textual descriptions and/or graphical images that indicate that a particular merchant has a high reputation, that a particular item is highly (or poorly) rated by other customers, and/or that a particular ad unit sells an item at the lowest price.

A customer account module 518 maintains accounts for customers 102 and allows new customers to establish accounts with the broker 106. An embodiment of the customer account module 518 includes a web server that presents a new customer with one or more web pages allowing the customer to create an account and select an ID, password and/or other identifying information. In one embodiment, the customer 102 also supplies payment information specifying a charge account and/or creating a stored value. The payment information can include, for example, a credit card number, a cellular telephone number, and/or a gift certificate identifier. The customer 102 can also supply information including mailing/shipping addresses and settings for miscellaneous preferences. In one embodiment, the customer account module allows a customer 102 to establish a default payment method and/or shipping address. Also, in one embodiment the customer 102 selects a graphical image that the broker 106 can later show the customer in order to prove that the customer is interacting with the broker and not a third party.

In one embodiment, the customer account module 518 provides the customer's web browser 310 with a cookie that identifies the customer and/or the customer's account. When the customer 102 interacts with the broker 106 through an ad unit, the customer's browser 310 provides the cookie to the broker 106, and the customer account module 518 identifies the customer 102 and the account.

An ad commerce module 520 supports ecommerce transactions performed through the ad units. To this end, the ad commerce module 520 performs functions such as determining the payment information and shipping addresses for the customers 102, providing a payment system that is used for the purchases, and interacting with the merchant 102 to facilitate delivery of the purchased item to the customer.

In one embodiment, when a customer 102 clicks on an ad unit or otherwise indicates a desire to purchase the advertised item, the ad commerce module 520 determines whether the customer's web browser has a cookie in its cookie cache 312 that identifies an account in the customer accounts module 518. If an account exists, the ad commerce module 520 uses the information in the account. Otherwise, the ad commerce module 520 allows the customer 102 to create a new account. In one embodiment, the ad commerce module presents the customer 102 with the customer's selected graphical image in order to prove to the customer that it is interacting with the broker 106 and not a third party. Further, the ad commerce module 520 requires the customer to provide a password or other identifying information before allowing the ecommerce transaction to occur.

In some embodiments, the ad commerce module 520 allows a customer 102 to purchase an item without creating an account. The customer provides payment information, a shipping address, and/or other information during the transaction, instead of selecting from among previously-supplied information stored in an account. The ad commerce module 520 uses this information to perform the ecommerce transaction.

The ad commerce module 520 uses the shipping address specified by the customer 102 in combination with pricing, shipping, and taxation rules supplied by the merchant 104 and/or otherwise available to the broker 106 and determines the total cost of the purchase. The ad commerce module 520 charges the customer 102 for the purchase, and provides the customer with a receipt. Further, an embodiment of the ad commerce module 520 interacts with the merchant 104 to inform the merchant of the purchase and coordinate shipping of the purchased item to the customer 102. In one embodiment, the ad commerce module 520 provides the customer-indicated shipping address and shipping options to the merchant 104. The merchant 104 sends the customer 102 an email message or other notification confirming the transaction. In one embodiment, the ad commerce module 520 does not charge the customer 102 until the merchant ships the ordered item.

In addition, an embodiment of the ad commerce module 520 monitors the transactions that occur using the broker 106, invoices the customers 102, and credits the merchants 104. In one embodiment, the ad commerce module 520 charges the customer's credit card or other method of payment and credits the merchant's account for the amount of the purchase. In another embodiment, the ad commerce module 520 aggregates purchases made by the customers and then periodically credits the merchants for the aggregate values of their sales within the period. In yet another embodiment, the ad commerce module 520 aggregates a customer's purchases within a given period and then charges the customer's account once for aggregate total of the purchases made within the period.

In one embodiment, the ad commerce module 520 deducts the merchant's bid price for the transaction from the amount credited to the merchant 104. For example, if the merchant's bid is 5%, and the item sold for $20, the ad commerce module 520 credits the merchant $19 and collects the remaining dollar. In one embodiment, the ad commerce module 520 shares the collected bids with the publisher 108 that published the web page having the ad unit through which the purchase was conducted. In some embodiments, the ad commerce module 520 accounts for other costs when calculating the commission, such as taxes collected, shipping charges, and transaction processing fees, as dictated by the applicable terms of service.

In one embodiment, the customer's interactions with the ad unit do not consummate the transaction. Rather, the commerce module 520 creates a virtual shopping cart at the broker 106 or merchant 104 containing the item advertised by the ad unit. The broker 106 or merchant 104 sends the customer 102 an email or other message referencing the shopping cart. The customer 102 uses the reference in the message to interact with the broker 106 and/or merchant 104 and purchase the item in the cart.

In one embodiment, the ad commerce module 520 includes a web server that uses AJAX and/or another technology to update the information displayed in comparison shop ad units in order to allow the customers 102 to view and select among the individual ad units within them and conduct the ecommerce transactions. For example, a comparison shop ad unit initially displays a first ad unit having an advertising message enticing a customer 102 to buy an item. The customer 102 uses arrows or other icons to navigate through the other ad units and view the initial advertising message associated with each one. Once the customer selects a specific ad unit by, e.g., clicking on the ad unit, the ad commerce module 520 uses the web server to change the display of the ad unit to allow the customer to log into an existing account at the broker 106 and/or create a new account. Subsequently, the ad commerce module 520 creates displays within the ad unit that allow the customer 102 to provide payment information and select a shipping method, show the total cost of the transaction, and/or show a confirmation code or other evidence that the transaction has completed.

Figure 6:
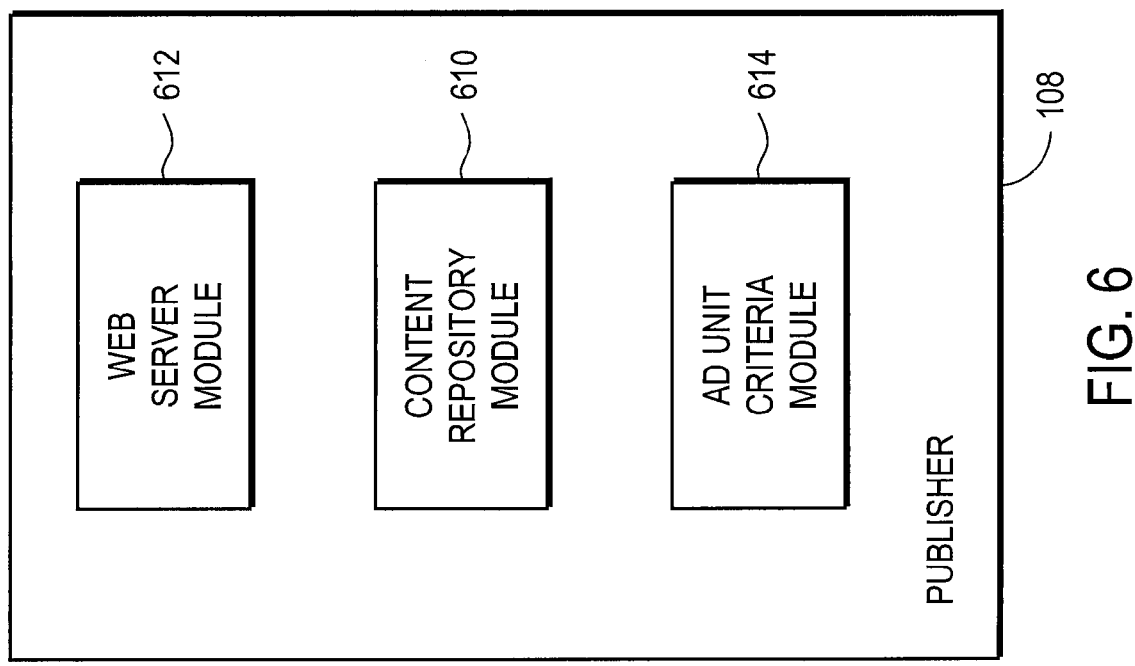
FIG. 6 is a high-level block diagram illustrating modules within a publisher according to one embodiment.

FIG. 6 is a high-level block diagram illustrating modules within the publisher 108 according to one embodiment. Those of skill in the art will recognize that other embodiments can have different and/or other modules than the ones described here, and that the functionalities can be distributed among the modules in a different manner.

In the illustrated embodiment, the publisher 108 includes a content repository module 610 for storing content published by the publisher. The content within the repository 610 includes for example, news stories, blog postings, fan fiction, multimedia content, and/or any other form of content provided by a publisher 108 on the Internet. In one embodiment, the content in the repository 610 are assembled into one or more web pages. These pages are represented in HTML and/or another markup language that describes how to render the web pages in a browser 310. The pages can be assembled in advance or created dynamically when required. A web server module 612 serves the web pages to customers 102 in response to customer requests.

In one embodiment, the publisher 108 and broker 106 coordinate on the formats of the web pages served by the publisher. Typically, the publisher 108 agrees to let certain regions on the page contain ad units. For example, the publisher 108 can agree to include ad units on the top left corner and right-hand margin of web pages it serves. In one embodiment, the broker 106 provides the publisher 108 with code to include in the web pages it serves. This code causes the customer's browser 310 to contact the broker 106, download ad units provided by the broker, and render the ad units on the publisher's web page. In one embodiment, the ad units are displayed within an inline frame (iframe) by the browser 310. Ad units within the iframe appear to be normal web page elements, but in fact are on a logically distinct web page and can be controlled and updated without affecting other elements on the (seemingly) same web page.

In one embodiment, the publisher 108 includes an ad criteria module 614 for defining criteria for ads that appear on the publisher's web pages. The publisher 108 uses this module 614 to filter undesirable ads and/or select specific ads from the ad unit catalog module 512. In some cases, the publisher uses the ad criteria module 614 to specify the appearance and format of the ads.

III. Process/Example

Figure 7:
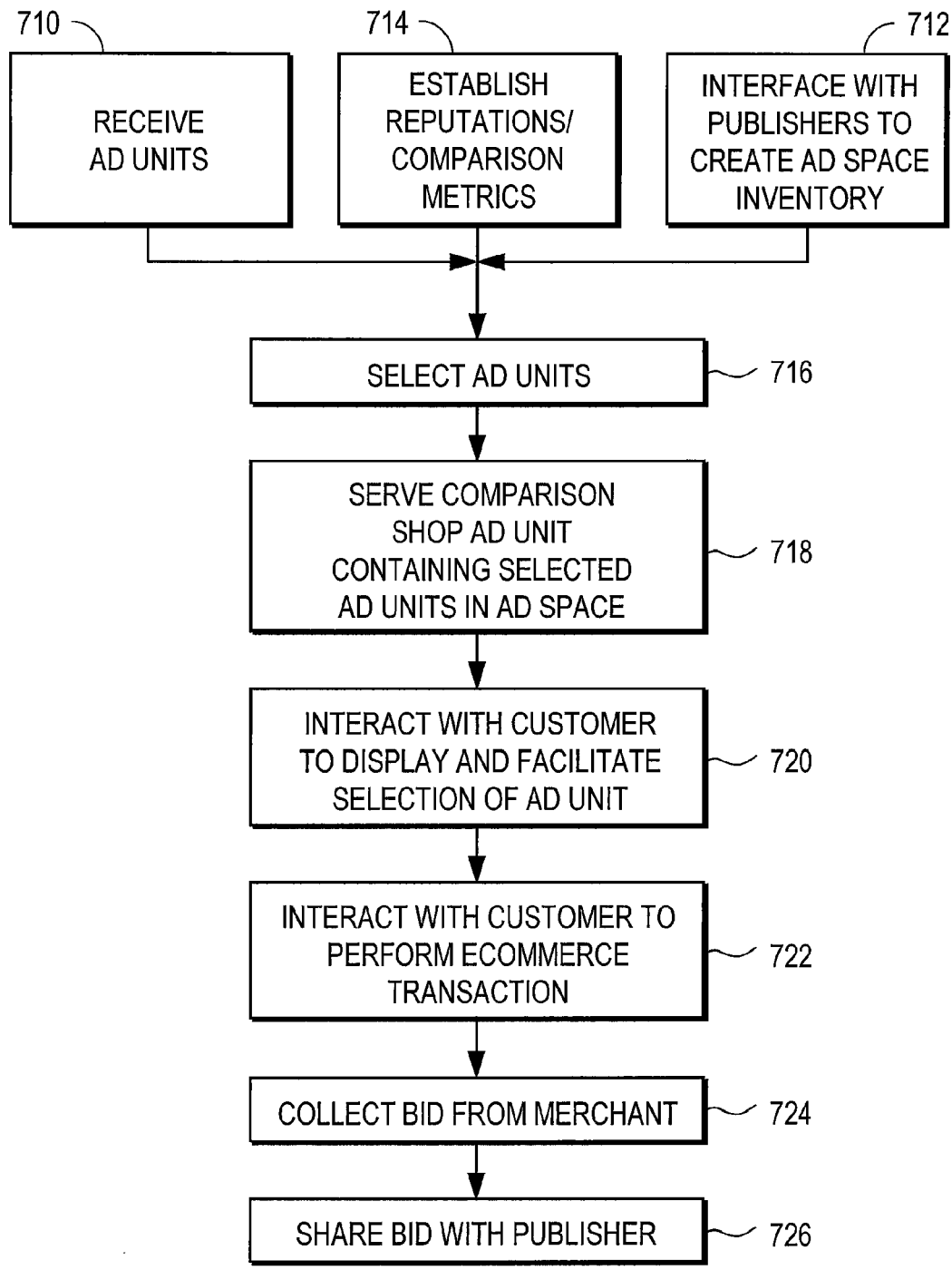
FIG. 7 is a flow chart illustrating the operation of the broker according to one embodiment of an exemplary transaction where a customer interacts with an ad unit to purchase an item.

FIG. 7 is a flow chart illustrating the operation of the broker 106 according to one embodiment of a representative transaction where a customer 102 interacts with an ad unit to purchase an item from a merchant 104. Those of skill in the art will recognize that other embodiments can perform the steps of FIG. 7 in different orders. Moreover, other embodiments can include different and/or additional steps than the ones described here.

Initially, the broker 106 receives 710 ecommerce-enabled ad units from the merchants 104. In one embodiment, the ad units are fully-formed, and contain all of the data that the broker 106 requires in order to support an ecommerce transaction with a customer 102. In another embodiment, the ad units contain partial data and the broker 106 receives 710 a separate data feed containing additional data for the ad units. The data provided by the merchants 104 include bid prices specifying amounts the merchants agree to pay the broker 106 upon sales of items through the ad units, upon impressions of the ad units, and/or upon customer clicks on the ad units. In addition, the data include targeting criteria specifying in what circumstances and/or where the broker 106 should run the ad units.

Contemporaneously, the broker 106 interfaces 712 with the publishers 108 to establish an ad space inventory. This inventory is formed of regions of web pages served to the customers 102 by the publishers 108. In one embodiment, the publishers 108 allow the broker 106 to serve ad units on the publishers' web pages in exchange for a share of the bid prices specified by the merchants 104. In addition, the broker 106 establishes 714 merchant reputation and comparison metrics data. These data are established, for example, by observing previously-conducted ecommerce transactions, receiving customer feedback, comments, or survey results, and/or purchasing the data from third parties.

At some point, a publisher 108 serves a web page having space for at least one ad unit to a customer 102. The broker 106 evaluates the characteristics of the served page along with merchant-specified targeting criteria, publisher-specified criteria, ad unit selection criteria, and/or additional criteria to select 716 a set of ad units from one or more merchants. The broker 106 creates a comparison shop ad unit containing the selected ad units and serves 718 the comparison shop ad unit in the ad space.

The customer 102 receives the web page and the comparison shop ad unit. If the customer 102 is interested in purchasing an item advertised by the comparison shop ad unit, the customer interacts with the ad to view the different offers presented by the ad units within it. If the customer 102 wants to purchase an item from a particular ad unit, the customer selects the ad unit by clicking on it or otherwise indicating an interest in the ad unit. The broker 106 facilitates 720 these customer interactions by causing the comparison shop ad unit to respond to the customer's actions. In one embodiment, the broker 106 uses AJAX and/or other technologies to update the images and text displayed in the comparison shop ad unit as the customer 102 interacts with it.

Further, the broker 106 also uses these technologies to interact 722 with the customer 102 through a customer-selected ad unit to conduct an ecommerce transaction for the item. Upon completion of the transaction, the broker 106 collects 724 the bid from the merchant 104 by, for example, by keeping a portion of the funds paid by the customer 102, or invoicing the merchant 104. In one embodiment, the broker 106 shares 726 a portion of the bid with the publisher 108.

FIG. 8 illustrates sample displays, labeled FIG. 8A-8D, generated by four individual ad units from different merchants contained within a single comparison shop ad unit 800 according to one embodiment. FIG. 8 shows simplified displays for purposes of example. Other embodiments will use different and/or additional displays. Moreover, the displays generated by the ad units can include aspects not shown, such as animated and/or multimedia aspects. In this example, all four ad units are selling shoes.

Each of the four sample displays illustrates the initial display of the ad unit when it is being shown within the comparison shop ad unit 800. Each initial display contains three primary regions. An ad display region 810 shows the advertisement created by the merchant 104 and designed to entice the customer 102 to purchase the shoes from the merchant. For example, FIG. 8A shows the name of the merchant, "Discount Shoe Store," in the ad display unit and FIG. 8B shows the message "Buy Google Shoes!" in the same region. In one embodiment, a customer 102 indicates a desire to buy the advertised item from a merchant by clicking in the ad display region 810 of that merchant's ad unit. In one embodiment, the comparison shop ad unit 800 simultaneously displays multiple ones of its constituent ad units. For example, the comparison shop ad unit 800 can present a display that shows two or four miniaturized versions of the initial ad unit displays in a single ad unit space. The customer 102 can select a particular ad unit by clicking on the miniature version of it.

A description region 812 contains a description of the merchant who's ad unit is currently being displayed by the comparison shop ad unit 800. In one embodiment, the description area displays information provided by the broker 106 that might assist the customer 102 in selecting a merchant and/or ad unit. This information can include information from the merchant reputation module 514 and/or information from the comparison metrics module 515. For example, the description area 812A of FIG. 8A reads "Lowest Price," indicating that the ad unit being shown sells the shoes for a lower price than the other ad units in the comparison shop ad unit. Similarly, the description area 812B of FIG. 8B reads "Highest Reputation," indicating that the merchant 104 that provided the ad unit being shown has the highest reputation of the merchants having ad units within the comparison shop ad unit. In contrast, the description area 812C of FIG. 8C shows three stars, which is the broker-assigned reputation score for the merchant that provided the ad unit. Likewise, the description area 812D of FIG. 8D shows only one star, which indicates that the merchant 104 that provided the ad unit shown in FIG. 8D has a lower reputation score than the merchant of FIG. 8C. In another example, the description area 812 can display the text "Highest Rated," indicating that the particular item being offered by the comparison shop ad unit has the highest comparison metrics score.

A navigation region 814 contains tools allowing the customer 102 to navigate among the individual ad units in the comparison shop ad unit 800. In the illustrated displays, the navigation regions 814 include left 816 and right 818 arrows that the customer 102 can use to navigate through the individual ad units. For example, selecting the right arrow 818 of the ad unit shown in FIG. 8A causes the comparison shop ad unit 800 to show the ad unit of FIG. 8B, and selecting the left arrow 816 of the ad unit in FIG. 8B displays the ad unit of FIG. 8A. The navigation region 814 also displays the word "Compare," which prompts the customer 102 to use the arrows to view the different ad units. In another embodiment, the navigation region 814 includes a set of tabs that the customer can use to select among the individual ad units.

In addition to the regions described above, an embodiment of the comparison shop ad unit 800 contains a region 820 showing indicia identifying the broker 106 and serving as a mark of quality and/or trustworthiness. In this example, the indicia is a stylized "G." Other embodiments lack this region or display the indicia in a different manner.

FIG. 9 illustrates three sample displays, labeled FIGS. 9A-9C, that the broker 106 creates in a particular ad unit 900 once the ad unit is selected by the customer 102 according to one embodiment. Assume that the customer 102 selects the ad unit displayed in FIG. 8B. In response, the broker 106 creates displays within the ad unit that guide the customer 102 through the ecommerce transaction. As in FIGS. 8A-8D, FIGS. 9A-C shows simplified displays for purposes of example. Other embodiments will use different and/or additional displays. Moreover, the displays within the ad unit can include aspects not shown, such as animated and/or multimedia aspects.

FIG. 9A illustrates a display shown on the ad unit after the customer 102 clicks on it. The display includes the indicia 914 of the broker 106. In the example of FIG. 9A, the broker 106 determined the customer's identity by reading a cookie stored by the customer's browser 312. The display shows the graphical image 916 previously selected by the customer 102 and stored in the customer's account. This graphical image 916 demonstrates that the customer 102 is interacting with the broker 106 and not a third party. Further, the broker 106 causes the ad unit to display text 918 identifying the customer 102 by name and inviting the customer to provide a password.

FIG. 9B illustrates a display shown on the ad unit asking the customer to select a payment method. In this example, the broker 106 has identified three possible payment methods based on data stored in the customer's account, and has caused the ad unit to display radio buttons 802 allowing the customer to choose the method for this transaction. For example, the broker 106 can ask the customer 102 to choose among three different payment cards that the broker has on file. In another embodiment, the broker 106 creates a display allowing the customer to enter a payment card number directly into the ad unit, rather than selecting from a previously-stored card. In addition, the ad unit displays the total amount 823 for the transaction, which in this example is $81.50. In one embodiment, the ad unit automatically utilizes the customer's default payment method and/or shipping address for the transaction. Therefore, the customer 102 can bypass the payment method selection step and conduct the ecommerce transaction in fewer steps.

FIG. 9C illustrates a display shown on the ad unit confirming that the transaction is complete. In this example, the ad unit shows a text message 922 stating that the transaction took place, and shows a confirmation code 924 for the transaction. In some embodiments, the broker 106 and/or merchant 104 sends an email or other message to the customer 102 to confirm the transaction instead of displaying the confirmation in the ad unit.

In one embodiment, the ad unit displays a telephone number and code identifying the specific offer made by the ad unit. This information is displayed instead of, or in addition to, the other information described above. The customer 102 initiates the transaction by calling the telephone number from a mobile phone or other telephone. The telephone number connects to the broker 106. The customer 102 uses the telephone to provide the offer code to the broker 106. In one embodiment, the customer 102 also provides additional information, such as a quantity and/or an authentication code. The broker 106 determines the customer's telephone number, and uses it to identify the customer's account and authenticate the customer 102. The broker 106 determines the offer identified by the offer code and interacts with the customer 102 by telephone to conduct the transaction.

In summary, a comparison shop ad unit allows the customer 102 to evaluate offers from multiple merchants yet occupy only a single ad placement space. The ecommerce-enabled ad units within a comparison shop ad unit allow the customer 102 to purchase items without leaving the web pages on which the ad units are displayed. Moreover, the ad units allow the merchant 104 to create a virtual store formed of ad units advertising items sold by the merchant and delivered to potential customers using merchant-specified targeting criteria. The broker 106 distributing the ad units collects a commission on each sale conducted through an ad unit, and shares the commission with the publishers 108 publishing the pages on which the ad units appear.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of conducting electronic commerce on a network, comprising:
   interfacing, by a computer, with a plurality of publishers on the network to define an inventory of ad spaces on electronic documents published by the publishers in which a comparison shop ad unit can be displayed;
   accessing, by a computer, advertising criteria provided by one or more of merchants, publishers or brokers associated with electronic commerce enabled ad units advertising items offered by the merchants;
   selecting, by a computer, a plurality of ad units based on the advertising criteria;
   combining, by a computer, the plurality of selected ad units into a single comparison shop ad unit, the comparison shop ad unit including a user interface element the comparison shop ad unit configured to:
      display a first ad unit of the plurality of ad units within a single ad space of an electronic document of a publisher, and
      selectively display a second ad unit of the plurality of ad units within the same single ad space in response to a selection of the user interface element,
   wherein the first ad unit is not displayed when the second ad unit is selectively displayed, the comparison shop ad unit occupying the single ad space of the electronic document, separate from the publisher content of the electronic document, the publisher content of the electronic document remaining displayed when the second ad unit is selectively displayed within the same ad space of the electronic document;
   serving, by a computer, the comparison shop ad unit for display on a display of a user device within the ad space of the electronic document published by the publisher; and
   interacting with a customer through an ad unit of the plurality of ad units of the comparison shop ad unit to enable the customer to purchase an advertised item of the ad unit.

2. The method of claim 1, wherein each ad unit of the plurality of ad units has an associated bid a merchant pays responsive to a purchase of an advertised item through the each ad unit, the method further comprising:
collecting an associated bid of the ad unit in response to the customer's purchase of the advertised item.

3. The method of claim 1, wherein each ad unit of the plurality of ad units has an associated targeting criteria, and wherein the selecting of the plurality of ad units is further based on the each ad units' associated targeting criteria and characteristics of the electronic document.

4. The method of claim 1, wherein the method further comprises:
identifying, by a computer, an item to offer responsive to item selection criteria, the item selection criteria comprising characteristics of the electronic document with which the comparison shop ad unit is to be displayed;
wherein the selecting of the plurality of ad units is further based on the identified item.

5. The method of claim 1, wherein the selecting of the plurality of ad units is further based on comparison metrics describing relative merits of items offered by the merchants.

6. The method of claim 1, wherein the advertising criteria includes ad unit selection criteria.

7. The method of claim 6, wherein the ad unit selection criteria comprises one or more criteria from the set consisting of:
a price of an item offered for sale by an ad unit;
a reputation of a merchant offering an item via an ad unit;
a bid price associated with an ad unit; or
historical ad unit performance.

8. The method of claim 1,
wherein the comparison shop ad unit includes a description region within the ad space displaying information about an ad unit being displayed by the comparison shop ad unit.

9. The method of claim 1, wherein the comparison shop ad unit includes ad units from a plurality of merchants.

10. The method of claim 1, further comprising:
serving, by a computer, the comparison shop ad unit for display on a display of a user device within a second ad space of a second electronic document published by a second publisher.

11. A system for conducting electronic commerce on a network, comprising:
a broker module for interfacing with a plurality of publishers on the network to define an inventory of ad spaces on electronic documents published by the publishers in which a comparison shop ad unit can be displayed;
a comparison shop ad generation module for generating a comparison shop ad unit, the comparison shop ad generation module configured to:
select a plurality of ad units from a collection of electronic commerce-enabled ad units based on advertising criteria provided by one or more of merchants, publishers or brokers, and
combine the plurality of selected ad units into a single comparison shop ad unit, the comparison shop ad unit including a user interface element, the comparison shop ad unit is configured to:
display a first ad unit of the plurality of ad units within a single ad space of an electronic document of a publisher, and
selectively display a second ad unit of the plurality of ad units within the same single ad space in response to a selection of the user interface element,
wherein the first ad unit is not displayed when the second ad unit is selectively displayed, —the comparison shop ad unit occupying the single ad space of the electronic document, separate from the publisher content of the electronic document, the publisher content of the electronic document remaining displayed when the second ad unit is selectively displayed within the same ad space of the electronic document
an ad unit serving module for serving the comparison shop ad unit for display on a display of a user device within the ad space of the electronic document;
a commerce module for interacting with a customer through an ad unit of the plurality of ad units of the comparison shop ad unit to enable the customer to purchase an advertised item of the ad unit; and
a processor for executing the modules.

12. The system of claim 11, wherein each ad unit of the plurality of ad units has an associated bid a merchant pays responsive to a customer purchase of the advertised item through the each ad unit, wherein the commerce module is further configured for collecting an associated bid of the ad unit in response to the customer's purchase of the advertised item.

13. The system of claim 11, wherein each ad unit of the plurality of ad units has an associated targeting criteria and wherein the selecting of the plurality of ad units is further based on the each ad units' associated targeting criteria and characteristics of the electronic document.

14. The system of claim 11, wherein the comparison shop ad generation module is further configured to identify an item to offer responsive to item selection criteria, wherein the selecting of the plurality of ad units is further based on the identified item.

15. The system of claim 14, wherein the item selection criteria comprise characteristics of the electronic document with which the comparison shop ad unit is to be displayed.

16. The system of claim 11, wherein the advertising criteria includes ad unit selection criteria.

17. The system of claim 16, wherein the ad unit selection criteria comprises one or more criteria from the set consisting of:
a price of an item offered for sale by an ad unit;
a reputation of a merchant offering an item via an ad unit;
a bid price associated with an ad unit; or
historical ad unit performance.

18. A computer program product having a non-transitory computer-readable storage medium having executable computer program code tangibly embodied therein for conducting electronic commerce on a network, the computer program code comprising:
a broker module for interfacing with a plurality of publishers on the network to define an inventory of ad spaces on electronic documents published by the publishers in which a comparison shop ad unit can be displayed;
a comparison shop ad generation module for generating a comparison shop ad unit, the comparison shop ad generation module configured to:
select a plurality of ad units from a collection of electronic commerce-enabled ad units based on advertising criteria provided by one or more of merchants, publishers or brokers, and
combine the plurality of selected ad units into a single comparison shop ad unit, the comparison shop ad unit including a user interface element, wherein the comparison shop ad unit is configured to:

display a first ad unit of the plurality of ad units within a single ad space of an electronic document of a publisher, and selectively display a second ad unit of the plurality of ad units within the same single ad space in response to a selection of the user interface element, wherein the first ad unit is not displayed when the second ad unit is selectively displayed, the comparison shop ad unit occupying the single ad space of the electronic document, separate from the publisher content of the electronic document, the publisher content of the electronic document remaining displayed when the second ad unit is selectively displayed within the same ad space of the electronic document an ad unit serving module for serving the comparison shop ad unit for display on a display of a user device within the ad space of the electronic document; and a commerce module for interacting with a customer through an ad unit of the plurality of ad units of the comparison shop ad unit to enable the customer to purchase an advertised item of the ad unit.

19. The computer program product of claim 18, wherein each ad unit of the plurality of ad units has an associated bid a merchant pays responsive to a customer purchase of the advertised item through the each ad unit, wherein the commerce module is further configured for collecting an associated bid of the ad unit in response to the customer's purchase of the advertised item.

20. The computer program product of claim 18, wherein each ad unit of the plurality of ad units has an associated targeting criteria and wherein the selecting of the plurality of ad units is further based on the each ad units' associated targeting criteria and characteristics of the electronic document.

21. The computer program product of claim 18, wherein the comparison shop ad generation module is further configured to identify an item to offer responsive to item selection criteria and wherein the selecting of the plurality of ad units is further based on the identified item.

22. The computer program product of claim 21, wherein the item selection criteria comprise characteristics of the electronic document with which the comparison shop ad unit is to be displayed.

23. The computer program product of claim 18, wherein the advertising criteria includes ad unit selection criteria.

24. The computer program product of claim 23, wherein the ad unit selection criteria comprises one or more criteria from the set consisting of:

a price of an item offered for sale by an ad unit;

a reputation of a merchant offering an item via an ad unit;

a bid price associated with an ad unit; or historical ad unit performance.

* * * * *